No. 837,229. PATENTED NOV. 27, 1906.
R. H. JOHNSON.
MANICURE AND CHIROPODIST'S APPARATUS.
APPLICATION FILED JAN. 7, 1904. RENEWED MAY 3, 1906.
4 SHEETS—SHEET 1.
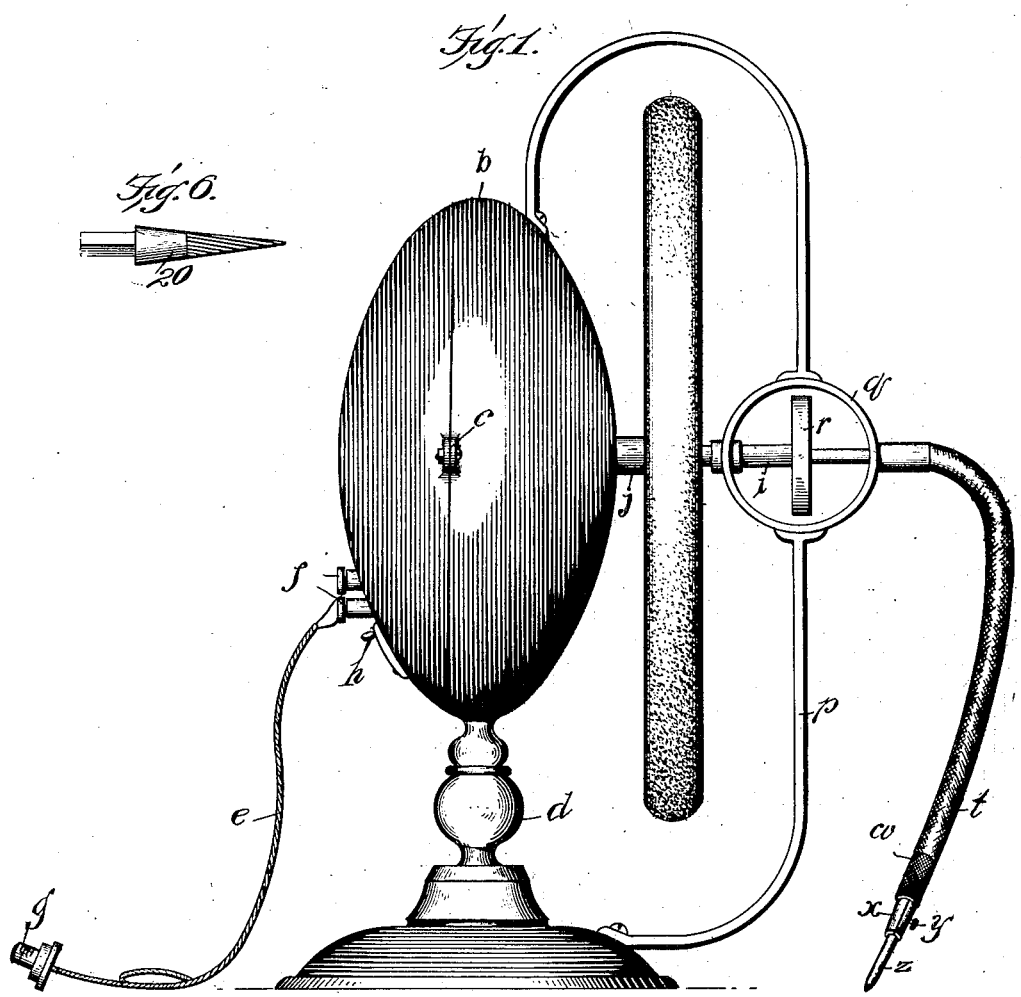

No. 837,229. PATENTED NOV. 27, 1906.
R. H. JOHNSON.
MANICURE AND CHIROPODIST'S APPARATUS.
APPLICATION FILED JAN. 7, 1904. RENEWED MAY 3, 1906.
4 SHEETS—SHEET 2.
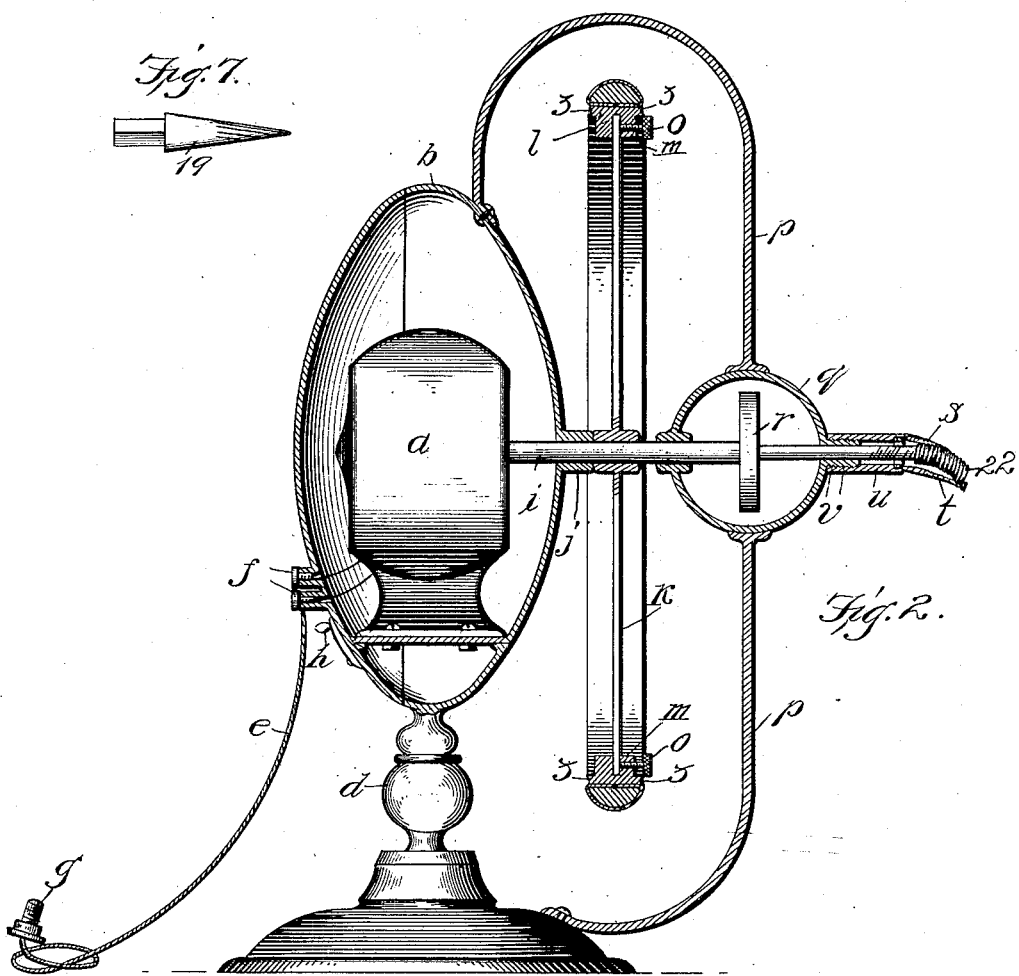
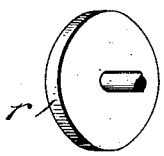
 
Inventor
R. H. Johnson.
By Wilkinson & Fisher.
Attorneys.
Witnesses
J. F. Pattison
Fred W. Englert No. 837,229. PATENTED NOV. 27, 1906.
R. H. JOHNSON.
MANICURE AND CHIROPODIST'S APPARATUS.
APPLICATION FILED JAN. 7, 1904. RENEWED MAY 3, 1906.
4 SHEETS—SHEET 3.
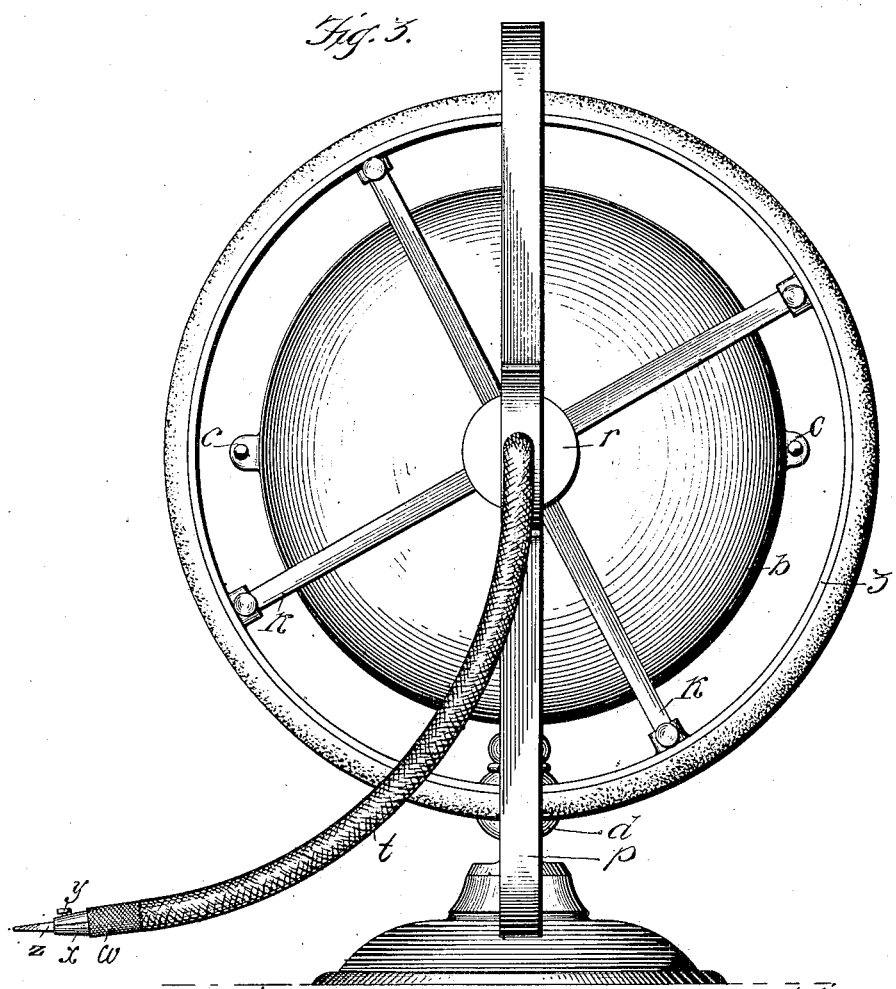
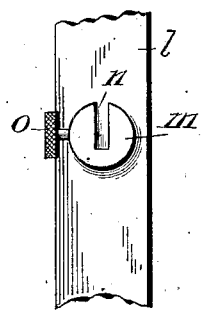
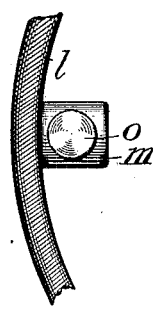
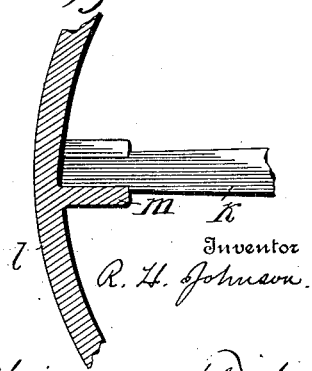

No. 837,229. PATENTED NOV. 27, 1906.
R. H. JOHNSON.
MANICURE AND CHIROPODIST'S APPARATUS.
APPLICATION FILED JAN. 7, 1904. RENEWED MAY 3, 1906.
4 SHEETS—SHEET 4.
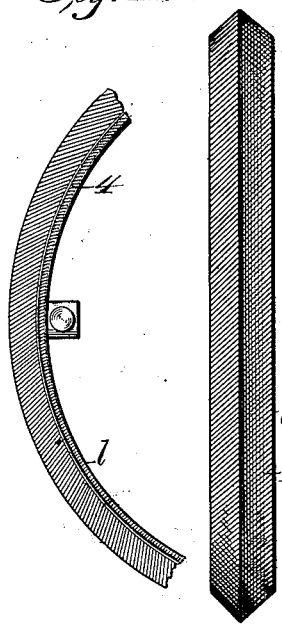
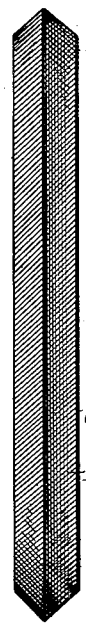
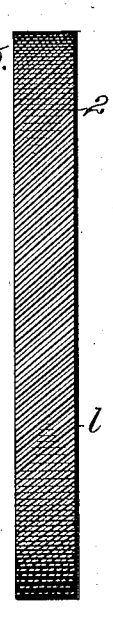
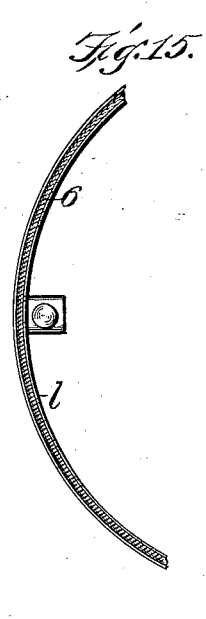
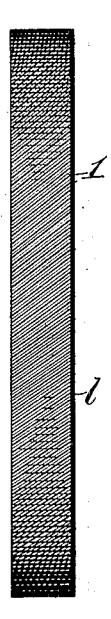
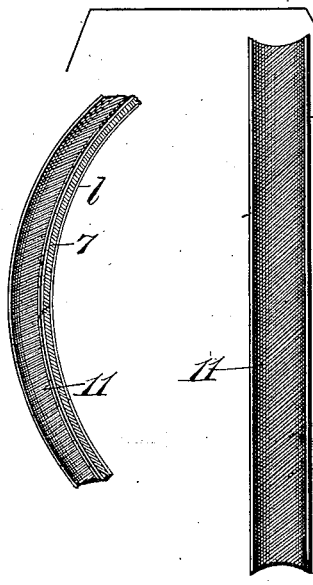
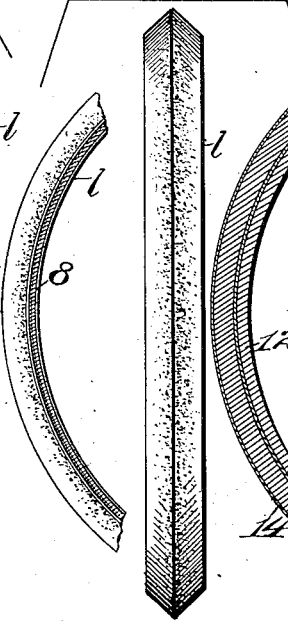
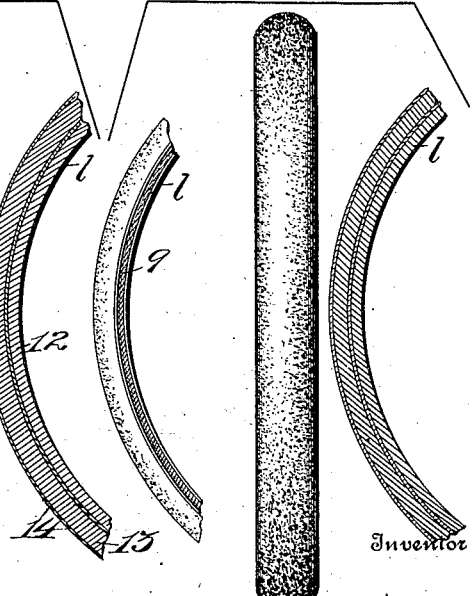
Witnesses
J. F. Pattison
Fred W. Englert
Inventor
R. H. Johnson
Wilkinson & Fisher
Attorneys

UNITED STATES PATENT OFFICE.

RICHARD HARVEY JOHNSON, OF BOISE, IDAHO, ASSIGNOR OF ONE-HALF TO CAROLINE DZUCK, OF BOISE, IDAHO.

MANICURE AND CHIROPODIST'S APPARATUS.

No. 837,229.     Specification of Letters Patent.     Patented Nov. 27, 1906.

Application filed January 7, 1904. Renewed May 3, 1906. Serial No. 314,953.

*To all whom it may concern:*

Be it known that I, RICHARD HARVEY JOHNSON, a citizen of the United States, residing at Boise, in the county of Ada and State of Idaho, have invented certain new and useful Improvements in Manicure and Chiropodists' Apparatus; and I do hereby declare the following to be a full, clear, and exact description of the invention, such as will enable others skilled in the art to which it appertains to make and use the same.

My invention relates to improvements in manicure and chiropodist apparatus; and the object of my invention is to provide a simple, cheap, and easily-operated apparatus suitable for this purpose.

Heretofore the operation of manicuring has always, so far as I am aware, been performed by hand by means of hand-tools and has been very tedious and unsatisfactory, so much so that only a comparatively small number of persons practice it. Even when performed by a professional and skilled manicurist the time required has been very great. Heretofore those doing their own manicuring have usually found it an unhandy and unsatisfactory operation, as most persons are awkward and unskilful in the use of instruments with the left hand, and have therefore found difficulty in properly manicuring the right hand. It also requires considerable practice and skill to file the nails by hand to a uniform shape.

By the use of my invention these and other difficulties heretofore experienced have been entirely obviated and the operation rendered very simple, expeditious, and in all respects satisfactory, requiring very little, if any, previous practice or experience.

In the accompanying drawings, Figure 1 is a side view of my complete apparatus. Fig. 2 is a longitudinal vertical section of the same, parts being shown in elevation. Fig. 3 is a side view of the apparatus. Figs. 4, 5, 6, 7, 8, 9, and 10 represent various forms of removable tools that may be applied to the apparatus. Figs. 11 and 12 represent in side and face view one of the revoluble files used. Figs. 13 and 14 represent in side and face view another form of file. Figs. 15 and 16 represent in side and face view another form of file, with a flat face. Fig. 17 represents in side and front elevation portions of another form of file. Fig. 18 represents in side view, front elevation, and section one form of the polishing device. Fig. 19 represents similar views of another form of polishing device. Fig. 20 is an internal view of a part of the rim, showing how it is fastened to the spokes. Fig. 21 is a side view of the same, and Fig. 22 is a central section of the same.

In the preferred form of my apparatus the machine consists of a small electric motor $a$, inclosed for the sake of safety in a casing $b$, in which it is secured in any suitable manner. This casing is composed of two parts hinged or bolted together, as shown at $c$. The casing is mounted upon a stand $d$.

The motor is similar to those commonly employed in electric fans and the newest styles of dental machines. It is obvious, however, that any suitable means may be used to drive the apparatus, and any suitable source of power may be employed. For instance, the apparatus may be run by means of a treadle and belt, as is often used with dental machines.

The apparatus shown in the drawings represents a small portable device. It may be placed in a suitable box or case, so that it may be used in traveling and for individual and family purposes. In this case only a small motor is required, and the motor itself, including the casing, is only about three inches in diameter. For use in manicuring-parlors a larger size is desirable, which may be fastened by screws or other suitable fastening means to the operating-table.

$e$ represents a pair of insulated wires of suitable length inclosed in the usual braided covering. These wires pass into the machine through openings controlled by the set-screws $f$, and at one end of the flexible cord $e$ is a plug $g$ for the purpose of connecting it with an electric power system by removing an incandescent-light bulb and inserting the plug, thereby obtaining the necessary power (which is very small) to operate the motor. The speed of the motor is regulated by a device $h$, which may be either the common button and indicator or the common shifting-lever employed in connection with small electric motors.

The revolving shaft $i$ of the motor projects through the casing $b$ some little distance through a bearing $j$ in the casing $b$ to receive the filing and polishing devices.

Mounted on the shaft $i$ and secured to or made integral with a hub which is mounted on the shaft $i$ are four spokes $k$, preferably made of flat metal, as shown, forming the interior part of a wheel to which removable abrading and polishing devices may be secured. These spokes are preferably made of flat brass or steel. The polishing devices are mounted in removable rims $l$, on the inside of which are secured four buttons or projections $m$, each provided with a slot $n$ and a set-screw $o$. The main part of each rim is large enough so that it will just encircle the ends of the spokes $k$, thus affording an easy means for securing to said spokes and removing therefrom the rims used for various purposes, which will be hereinafter described.

The outer ends of the spokes may be reduced in size, if desired, to enter the slots $n$, although this is not strictly necessary. The diameter of the circle described by the ends of these spokes when revolving should be about four or five inches, according to the size of the machine. If desired, a circular strip of metal parallel to the removable rim may be riveted to the spokes in order to stiffen and strengthen the structure.

Secured to the casing $b$ and encircling the spokes $k$ is a strip $p$, and in the center of this strip is fastened a circular strip $q$, which affords bearings for the extended shaft $i$. Within the strip $q$ on the shaft $i$ is removably mounted an emery-wheel $r$. On the right of the emery-wheel $r$, as shown in the drawings, the shaft $i$ is reduced in size, and the end thereof is provided with a screw-threaded portion $s$ for the attachment of the usual flexible shaft 22, commonly employed in dental machines. This flexible shaft is contained within a suitable covering $t$, which is secured to a metal tip $u$, which tip is screw-threaded upon a boss $v$ upon the strip $q$. The covering $t$ is provided with the usual hand-hold $w$, through which projects the clamp $x$, provided with a set-screw $y$ for holding the operating-tool $z$.

It is obvious that any form of clamp could be used instead of the clamp $x$ and set-screw $y$—as, for instance, the usual form of chuck often employed in dental machines.

The circular devices adapted to be mounted on the spokes $k$ are of two kinds—files and polishers—typical forms of which are shown in Figs. 11 to 19, inclusive. These are made each in a continuous or endless piece, there being no break in the circle.

The files are made of different shapes and degrees of fineness. In Fig. 16, 1 represents a fine file with a flat face, and in Fig. 14, 2 represents a similar coarser file. Each of the files and polishers is provided with a concave portion or portions inside of the rim, as shown at 3 in Fig. 2, and at 4, 5, 6, 7, 8, and 9 in Figs. 11, 13, 15, 17, 18, and 19. In Fig. 12 is shown a file 10 provided with two surfaces inclined to each other and terminating in a sharp ridge. In Fig. 17 is shown a circular file 11, having a concave face, the same being shown in section and elevation in said figure. In Figs. 18 and 19 are shown two different shapes of polishers.

Referring to Fig. 18, 12 represents a metal strip, and 13 a wooden strip. 14 represents a cover of chamois-skin, kid, leather, or other suitable material, which is bent around the wood cover 13 and passes between the parts 12 and 13, which are secured together by glue or screws in any suitable way. The outside of the polisher shown in Fig. 18 is composed of two faces at an angle to each other, terminating in a sharp ridge. The polisher shown in Fig. 19 is similar to that shown in Fig. 18, except that the outer surface is curved, as shown.

A number of different removable tools or tips are provided which are adapted to be secured in the clamp $x$.

15, Fig. 4, represents an orange-wood stick to be inserted therein.

16, Fig. 5, represents a small metal clamp of suitable shape, preferably provided with a set-screw 17, in which may be removably inserted a small ball 18, of absorbent cotton, or a small piece of linen cloth or other suitable material, or a small rubber tip, which when moistened with ongoline or other suitable material and rapidly revolved will remove stains and discolorations from the skin and nails and the superfluous cuticle from the cuticular folds of the nails much more rapidly and effectually than has hitherto been done by hand.

19, Fig. 7, represents a small metal tip, preferably nickel-plated, polished, and with a dull point and with very fine flutes or ridges, as on a file, as shown. 20, Fig. 6, represents a similar tip provided with coarser flutes or ridges.

21, Figs. 8 and 9, shows a small brush also adapted to be inserted in the clamp $x$.

The use of all these forms of tips, files, and polishers will be readily apparent to the skilled operator.

While I have described my invention as especially applicable to manicuring purposes, it is obvious that it is not restricted to such uses. For instance, it may be used by a chiropodist, and the rapidly-revolving files serve as a means for quickly and efficiently treating corns, bunions, and excrescences on the feet.

Having thus described my invention, what I claim as new, and desire to secure by Letters Patent of the United States, is—

1. In a manicure and chiropodist apparatus, the combination of a support, a casing mounted on said support, an electric motor mounted in said casing and provided with a shaft which projects through one side of said casing, a suitable strip secured to said casing and support, and a second strip secured to said first-named strip and providing bearings for said shaft, substantially as described.

2. In a manicure and chiropodist apparatus, the combination of a support, a casing mounted on said support, an electric motor mounted in said casing and provided with a shaft which passes through one side of said casing, which thereby provides a bearing for said shaft, a metal strip secured above and below said shaft to said casing and said support respectively, and a circular metal strip provided with enlargements secured about centrally of said first-named strip, said enlargements acting as bearings for said shaft, substantially as described.

3. In a manicure and chiropodist apparatus, the combination of a base, a divided casing mounted on said base, an electric motor mounted in said casing and provided with a shaft, which extends through one side of said casing, a metal strip secured to said casing and said base, a second metal strip provided with enlargements acting as bearings for said shaft, said second strip being secured to said first-named strip at about the center thereof, means for supplying an electric current to said motor, and means for regulating the current, substantially as described.

4. In a manicure and chiropodist apparatus, the combination of a support, a casing mounted on said support, an electric motor mounted in said casing and provided with a shaft projecting through one side of said casing, metal strips forming additional bearings for said shaft, an abrading-wheel carried by said shaft, a series of spokes fastened to said shaft, a rim removably secured to said spokes, a flexible driving-shaft secured to said first-named shaft, and a tool operated by said flexible driving-shaft, substantially as described.

5. In a manicure and chiropodist apparatus, the combination of a base or support, a divided oval casing mounted on said base, an electric motor mounted in said casing and provided with a shaft extending through one side of said casing, which thereby serves as a bearing for said shaft, means for supplying electricity to said motor, means for regulating said supply of electricity, a metal strip secured to said casing and said base above and below said shaft, a second circular strip secured to said first-named strip near its center and provided with enlargements acting as bearings for said shaft, an abrading-wheel carried by said shaft, a series of spokes fastened to said shaft, a series of rims, any one of which may be secured to said spokes, said rims being provided with polishing or abrading material, a flexible shaft secured to said first-named shaft, a cover for said flexible shaft, a clamp at the end of said flexible shaft, and a series of polishing or abrading tools adapted to be removably inserted in said clamp, substantially as described.

In testimony whereof I affix my signature in presence of two witnesses.

RICHARD HARVEY JOHNSON.

Witnesses:
   FRED BROWN,
   P. K. EMBA.